(12) United States Patent
Schmidt et al.

(10) Patent No.: US 6,793,475 B2
(45) Date of Patent: Sep. 21, 2004

(54) COEXTRUSION NOZZLE ARRANGEMENT

(75) Inventors: Hans-Ullrich Schmidt, Hofheim (DE); Udo Schütz, Burgproppach (DE); Jürgen Schulz, Hassfurt (DE)

(73) Assignee: Frankische Rohrwerke Gebr. Kirchner GmbH & Co. KG (DE)

( * ) Notice: Subject to any disclaimer, the term of this patent is extended or adjusted under 35 U.S.C. 154(b) by 0 days.

(21) Appl. No.: 10/022,576

(22) Filed: Dec. 17, 2001

(65) Prior Publication Data

US 2002/0076461 A1 Jun. 20, 2002

(30) Foreign Application Priority Data

Dec. 15, 2000 (DE) .......................................... 100 62 590

(51) Int. Cl.[7] .............................................. B29C 47/06
(52) U.S. Cl. .............................. 425/133.1; 425/192 R; 425/380; 425/462
(58) Field of Search ........................ 425/133.1, 192 R, 425/380, 462, 464, 186

(56) References Cited

U.S. PATENT DOCUMENTS

| 3,677,676 A | * | 7/1972 | Hegler ........................ 425/504 |
| 3,890,083 A | * | 6/1975 | St. Eve ........................ 425/462 |
| 3,994,644 A | * | 11/1976 | Hegler et al. ................ 425/112 |
| 3,994,646 A | * | 11/1976 | Hauck ...................... 425/133.1 |
| 5,908,642 A | | 6/1999 | Veen et al. |
| 6,045,347 A | * | 4/2000 | Hegler ..................... 425/133.1 |
| 6,050,805 A | * | 4/2000 | Lupke ...................... 425/326.1 |

FOREIGN PATENT DOCUMENTS

| DE | 40 10 404 A1 | 10/1990 | |
| EP | 0 243 516 A1 | 11/1987 | |
| EP | 0 834 386 A1 | 4/2000 | ........... B29C/47/22 |
| GB | 994 567 A | 6/1965 | ........... B29C/47/20 |
| WO | WO 96/28294 | 9/1996 | |

* cited by examiner

Primary Examiner—Robert Davis
Assistant Examiner—Joseph S. Del Sole
(74) Attorney, Agent, or Firm—Pendorf & Cutliff

(57) ABSTRACT

Disclosed is a nozzle arrangement for the coextrusion of a product with at least two layers, whereby a distributor portion 14 adjacent to the extruder is provided through which an extruding mass is delivered to the extruder and whereby a nozzle portion 12 for the extrusion of the extrusion mass is connected to the distributor portion, whereby in accordance with the invention a mounting and connecting base is provided between the distributor portion and the nozzle portion.

7 Claims, 1 Drawing Sheet

COEXTRUSION NOZZLE ARRANGEMENT

FIELD OF THE INVENTION

The invention relates to a coextrusion nozzle arrangement with a distributor portion associated with an extruder for delivery of an extrudate to a nozzle portion for coextrusion of the extrudate.

BACKGROUND ART

Such nozzle arrangements are common in extruders or extrusion devices. A known coextrusion nozzle head is commonly mounted on at least one extruder in such a way that the nozzle set can be exchanged with another nozzle set, to manufacture, for example, other pipe diameters, layered pipe profiles, or the like. The connection region between the nozzle portion and the distributor portion of the nozzle head, which is exchanged only rarely, must thereby be able to withstand significant pressures.

When a nozzle set of a coextrusion nozzle head is exchanged, the various portions of the nozzle set with which the nozzle head is equipped, must, according to the prior art, be removed one after the other from the distributor portion of the coextrusion nozzle head and cleaned from extrudate. Thereafter, the corresponding portions of the nozzle set with which the production device is to be refitted, must be installed. The various portions must thereafter be aligned and adjusted for the extrusion of a usable product. This alignment requires significant time. Furthermore, a flawed product is produced during the alignment process, which cannot be economically used. Thus, very expensive machinery, an extruder and production machinery connected thereto, such as a corrugator, are deactivated over an extended a period of time, until the refitting of the ejection head is completed.

During the disassembling and cleaning of the portions of the nozzle set in the hot condition, there is a risk of accident and damage. This means that the dismantling of the nozzle parts brings with it a not insignificant risk of damage and the cleaning of the nozzle parts must be carried out in the hot condition, whereby reheating with a heat source is necessary. This is a costly process which leads to scratching of the surface of the nozzle parts, whereby scratches must later be removed by polishing. This respectively leads to a material removal, which in the end causes wear.

During the installation of the new coextrusion nozzle set and the subsequent alignment steps, very significant, preferably also acentrical forces act on the exchanged coextrusion nozzle set, which forces subject the nozzle set to high mechanical loads and can very significantly reduce its service life.

Thus, according to the prior art, one must in some way or another put up with long downtimes, material waste, as well as wear on the nozzle set of the nozzle head itself for the readjustment of an ejection head from one product to another.

SUMMARY OF THE INVENTION

It is an object of the present invention to further develop generic nozzle arrangements so that the mentioned disadvantages are overcome at least in part.

In particular, it is an object of the invention to enable a quick exchange of a coextrusion nozzle set.

This object is achieved with a nozzle arrangement wherein a mounting and connecting base is provided between the distributor portion and the nozzle portion.

Preferably, it is thereby possible to maintain the exit nozzle portion in a predetermined installation arrangement, which is also maintained relative to the distributor portion during the removal of the mounting and connecting portion together with the nozzle portion. If later another nozzle portion, which is also preadjusted and fixed on a mounting and connecting base, is mounted onto the distributor portion of the nozzle arrangement of the ejection head, practically no alignment or test run of the ejection head is necessary for the manufacture of a finished product.

It is further possible, since little alignment of the nozzle portion of the coextrusion nozzle set is necessary, to install the whole nozzles preheated to a desired operating temperature which is selected for a specific plastic, so that the refitting, installation and preheating times which otherwise take away from the production time, can be further reduced.

If alignment steps are necessary, they are very significantly reduced relative to the prior art, if not even negligible.

The mechanical loads on the nozzle set can be significantly reduced, since additional stress by alignment is significantly, if not completely avoided.

Of course, the mounting and connecting base can also be made of several portions and thus need not necessarily be made in one piece. The one-piece construction is preferred for the installation connecting base. However, a two part mounting and connecting base, for example, can also provide, to a reduced extent, the above mentioned features according to the invention. For example, it is possible to separately mount centrally inwardly positioned portions of a coextrusion nozzle set and to mount onto the distributor portion only further outwardly located portions of the nozzle which are preinstalled on the mounting and connecting base.

The mounting and connecting base preferably also includes a respective guide channel which conducts the extrudate from the distributor portion to the nozzle portion. The distributor portion and/or the nozzle portion can thereby include channel extensions which bridge the distance between these portions, whereby the mounting and connecting base used includes corresponding recesses for the receiving of the channel extensions. In this case it is possible to reduce the number of seals so that, although the mounting and connecting base is located between the distributor portion and the nozzle portion, the number of seals is reduced to the number of seals necessary according to the prior art, since only one abutment plane exists for the supply conduits, whereby the openings for the connecting webs must also be sealed.

In order to guarantee a sufficient sealing of the nozzle arrangement in accordance with the invention, even at the high pressures to which the extrudate must regularly be exposed, it is advantageous when sealing means are provided at the respective abutment locations or planes. For example, seals can be provided between the aforesaid channel extensions and the surrounding distributor and/or nozzle portion. If the sealing surfaces are displaced onto the mounting and connecting base, corresponding sealing means are provided accordingly on their sides directed towards the respectively connecting portions or on the connecting portions themselves.

It has proven especially advantageous when sealing means are used which upon a pressure load automatically provide a larger sealing effect. The sealing action of a corresponding sealing means can increase over a large pressure range proportionally with or dependent on the pressure, which means it is not necessary to apply mechanical forces which adjust a seal to the maximum expected pressure load, since the sealing means itself automatically adjusts its sealing action to the pressure load. Liquid material, which exits in the case of a leak exerts a pressure on the geometrical shape of the seal which leads to a stronger pressing of the sealing surfaces of the seal onto the surrounding device portions so that leaks can be sealed. Ductile metals can also be used for the seals. For example, copper, tin or the like can be used herefor.

The mounting and connecting base is preferably made of several, for example, concentrically positioned, annular disks between which annular connecting conduit gaps are provided for the passage of the extrusion mass.

On the other hand, the installation or connecting base can advantageously also be constructed in the shape of a webbed disk and/or an apertured disk so that the extrudate to the transported can be guided through the apertures or in between the webs.

At least one centering arrangement is preferably provided for the centering of the mounting and connecting base relative to the distributor portion and to align or center the portions of the nozzle set relative to the mounting and connecting base. Respective centering and alignment arrangement are preferably provided, so that a centering can be carried out, for example, by adjustment of one or more bolts or screws.

The nozzle arrangement in accordance with the invention can of course also be constructed for more than two extrudate streams. The present invention is especially advantageously useable for extrusion products with more than two layers, for which the alignment would be even more complicated and costly.

BRIEF DESCRIPTION OF THE DRAWING

The present invention will now be further described by way of an exemplary preferred embodiment according to the invention. Further goals, features and advantages according to the invention are thereby discussed with reference to the drawings, wherein.

DETAILED DESCRIPTION OF THE PREFERRED EMBODIMENT

Figure 1:
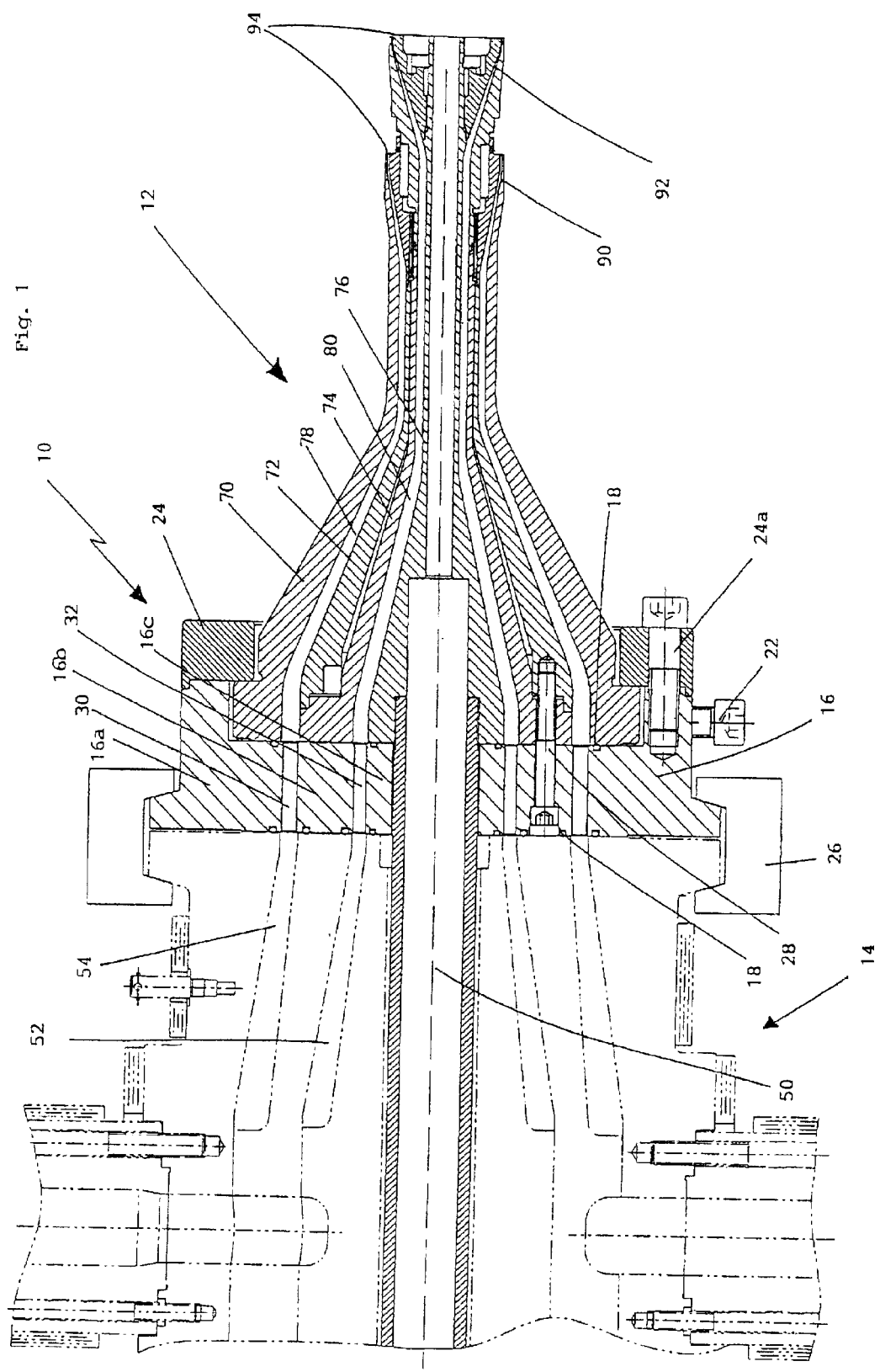
FIG. 1 is a longitudinal section through a nozzle arrangement with features according to the invention.

FIG. 1 shows in longitudinal section a coextrusion nozzle arrangement 10 with a distributor portion 14, a mounting and connecting base 16 and a nozzle portion 12. The distributor portion 14 is of the conventional type and therefore does not need to be further described. Regarding the distributor portion, it needs only mentioning that it includes, for example, two feed channels 52, 54 for the coextrusion of two layers, through which one or respective extrudates can be supplied. A supply channel 50 is positioned centrally through the distributor portion 14, through which, for example, cooling fluid can be supplied to a (not illustrated) cooling and calibration pin, which is also sufficiently known from the prior art and therefore need not be further described herein. The pin protrudes from the channel 50 from an exit end 94 of the nozzle portion 12 and is positioned within the exiting thermoplasticly deformable extrusion result.

The nozzle portion 12 has several coaxially positioned nozzled portions. An outer nozzle part 70 forms an outer nozzle channel 78 in connection with a radially inwardly adjacent nozzle part 72, which nozzle channel opens into an annular nozzle annular gap 90 at the exit end 94 of the nozzle portion 12. Radially inwardly adjacent hereto is a corresponding arrangement of an outer nozzle part 74 and an inner nozzle part 76, which together again form an annular flow channel 80, which opens into an annular nozzle gap 92 of the nozzle portion 12.

In accordance with the invention, a mounting and connecting base 16 is positioned between the distributor portion 14 and the nozzle portion 12. The various components of the nozzle portion 12 are fixed onto this base 16 and the base 16 in turn is connectable with the distributor portion 14 in a well-defined orientation.

The mounting and connecting base 16 is connected with the distributor portion 14 by way of a solid clamping ring 26 or the like. The base 16 can thereby cooperate with the connecting flange of the distributor portion 14 and the clamping ring 26 in such a way that an exactly aligned positioning is possible without significant alignment work. Seals 18 are provided between the end surface of the distributor portion 14 and the respectively opposite end surface of the mounting and connecting base 16 in order to seal to ambient the flow channels 52, 54 and the flow channels 30, 32 within the base 16 which are connected thereto.

The mounting and connecting base 16 has several concentrically positioned annular sections 16a, 16b and 16c between which the flow channels 30, 32 are formed. The flow channels 30, 32 can be in the form of bores arranged in a circle or in the form of annular rings which are connected by webs.

The nozzle part 70 is connected with the base 16 by way of a clamping flange 24, whereby on the one hand a fastening can be achieved by way of a bolt 24a and on the other hand a centering by way of a bolt 22. Seals 18 are also provided for the abutment surface between the base 16 and the nozzle portion 12. Optionally, nozzle parts 72 and 74 are connected with the base 16 by way of bolt 28.

In order to enable a fast fixing of a nozzle portion 12 on a distributor portion 14, it is only necessary to open or loosen the clamping ring 26 and the clamping of the nozzle portion 76 to the distributor portion 14, to remove in one piece the flanged-on base 16 with the nozzle portion 12 connected thereto and to fasten another base 16 with a nozzle portion already fully aligned thereon and fastened thereto, again by way of the clamping ring 26. A disassembly and cleaning of the individual nozzle parts of which the nozzle portion 12 is assembled, is thereby obviated and it is possible to achieve a proper alignment without large expenditure in time and without the production of a large amount of waste, whereby at the same time the nozzle portion is spared as much as possible from wear by alignment operations.

What is claimed is:

1. Coextrusion nozzle arrangement, comprising
a distributor portion adjacent an extruder for delivery of an extrudate,
a nozzle portion for the extrusion of the extrudate, wherein the extrudate comprises at least one plastic, and wherein the nozzle portion is adapted for at least two extrudate flows,
a mounting and connecting base between the distributor portion and the nozzle portion, whereby the mounting and connecting base is shaped and constructed for holding the nozzle portion in a predetermined installation arrangement which is maintained relative to the distributor portion during the dismantling of the mounting and connecting base together with the nozzle portion,
wherein the mounting and connecting base further comprises connecting channels for connecting the channels in the distributor portion with the channels in the nozzle portion, and sealing means are provided on at least one abutment location between the mounting and connecting base and the distributor portion, such that the flow channels of the mounting and connecting base and the flow channels of the distributor portion are sealed to the ambient, wherein the sealing means automatically develops larger sealing force or action upon the application of an increased pressure load.

2. Nozzle arrangement according to claim 1, wherein the distributor portion and/or the nozzle portion include channel extensions which bridge a spacing between these portions due to the size of the mounting and connecting base.

3. Nozzle arrangement according to claim 1, wherein the mounting and connecting base includes several annular disks with intermediate interrupted annular connecting conduit gaps for the passage of the extrusion mass.

4. Nozzle arrangement according to claim 1, wherein the installation or connecting base is constructed as a webbed disk and/or apertured disk, whereby the apertures or the spaces between the webs allow for passage of the extrusion mass.

5. Nozzle arrangement according to claim 1, wherein at least one centering arrangement is provided for the centering of the mounting and connecting base relative to the distributor portion and to align or center the portions of the nozzle set relative to the mounting and connecting base, whereby preferably two centering members are provided.

6. Nozzle arrangement according to claim 1, wherein the nozzle arrangement is constructed for more than two extrudate flows.

7. Nozzle arrangement according to claim 1, wherein the mounting and connecting base is fastened to the distributor portion by at least one tensioning means.

* * * * *